(12) United States Patent
Kabacinski et al.

(10) Patent No.: US 9,622,574 B2
(45) Date of Patent: Apr. 18, 2017

(54) TRAY SUPPORT SYSTEM

(71) Applicant: InterMetro Industries Corporation, Wilkes-Barre, PA (US)

(72) Inventors: André F. Kabacinski, Duryea, PA (US); Michael A. Merritt, Wilkes-Barre, PA (US); Douglas J. Kaminski, West Wyoming, PA (US)

(73) Assignee: InterMetro Industries Corporation, Wilkes-Barre, PA (US)

( * ) Notice: Subject to any disclaimer, the term of this patent is extended or adjusted under 35 U.S.C. 154(b) by 0 days.

(21) Appl. No.: 15/042,900

(22) Filed: Feb. 12, 2016

(65) Prior Publication Data

US 2016/0235197 A1 Aug. 18, 2016

Related U.S. Application Data

(60) Provisional application No. 62/116,104, filed on Feb. 13, 2015, provisional application No. 62/127,001, filed on Mar. 2, 2015.

(51) Int. Cl.
| | |
|---|---|
| *A47B 47/00* | (2006.01) |
| *A47B 88/04* | (2006.01) |
| *B62B 3/00* | (2006.01) |
| *A47B 31/00* | (2006.01) |

(52) U.S. Cl.
CPC ...... *A47B 47/0083* (2013.01); *A47B 88/0451* (2013.01); *B62B 3/006* (2013.01); *A47B 2031/003* (2013.01); *A47B 2031/005* (2013.01); *A47B 2210/0024* (2013.01)

(58) Field of Classification Search
CPC . A47B 57/585; A47B 88/12; A47B 2031/003; A47B 2031/005; A47B 2031/007; A47B 2210/0059; A47B 57/50; A47B 31/00; A47B 47/0083; A47B 88/0451; A47B 2210/0024; A47F 5/0025; B62B 3/006; F24C 15/16
USPC ...................................... 211/126.15
See application file for complete search history.

(56) References Cited

U.S. PATENT DOCUMENTS

| | | | | |
|---|---|---|---|---|
| 3,124,402 | A * | 3/1964 | Rhoads ............... | A47B 88/12 211/162 |
| 3,655,063 | A * | 4/1972 | Landry ............... | A47F 5/0025 211/126.15 |
| 4,004,819 | A * | 1/1977 | Brongo ............... | A21B 1/50 211/181.1 |

(Continued)

*Primary Examiner* — Korie H Chan
(74) *Attorney, Agent, or Firm* — Harness, Dickey & Pierce, P.L.C.

(57) ABSTRACT

A tray support rack has a top member, a bottom member, a first frame that extends from the top member to the bottom member on a first side of the tray support rack, and a second frame that extends from the top member to the bottom member on a second side of the tray support rack. The first frame includes a first set of parallel rails, with each parallel rail of the set being spaced apart from another parallel rail to define a first guide space therebetween, and a first bottom support rail spaced apart from the first set of parallel rails. The second frame includes a second set of parallel rails, with each parallel rail of the set being spaced apart from another parallel rail to define a second guide space therebetween, and a second bottom support rail spaced apart from the second set of parallel rails.

17 Claims, 12 Drawing Sheets

(56) References Cited

U.S. PATENT DOCUMENTS

| | | | | |
|---|---|---|---|---|
| 4,725,066 A * | 2/1988 | Nootenboom | ........ | B62B 3/006 |
| | | | | 211/126.15 |
| D460,848 S * | 7/2002 | Tzeng | ........................ | D34/21 |
| D488,334 S * | 4/2004 | Post | ............................ | D6/702 |
| 6,732,662 B2 * | 5/2004 | Welch | .................... | A47B 31/00 |
| | | | | 108/109 |
| 8,616,386 B1 * | 12/2013 | Tsai | ....................... | A47B 88/12 |
| | | | | 211/126.15 |
| 9,131,773 B2 * | 9/2015 | Tsai | ....................... | A47B 88/16 |

* cited by examiner

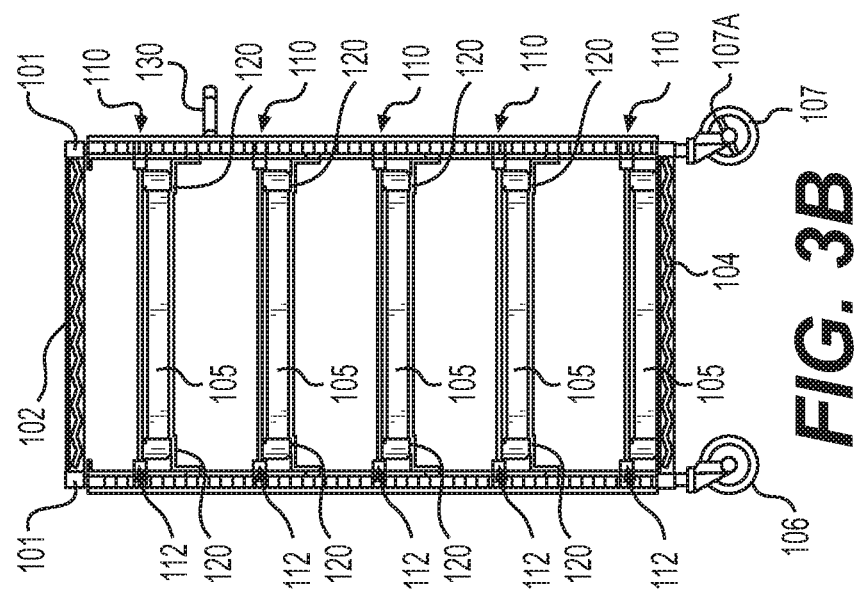
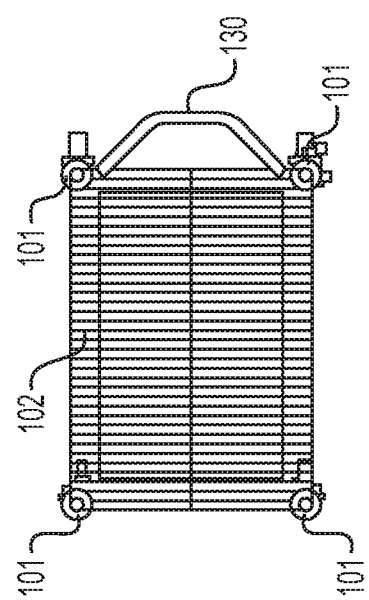
FIG. 3B
FIG. 3A

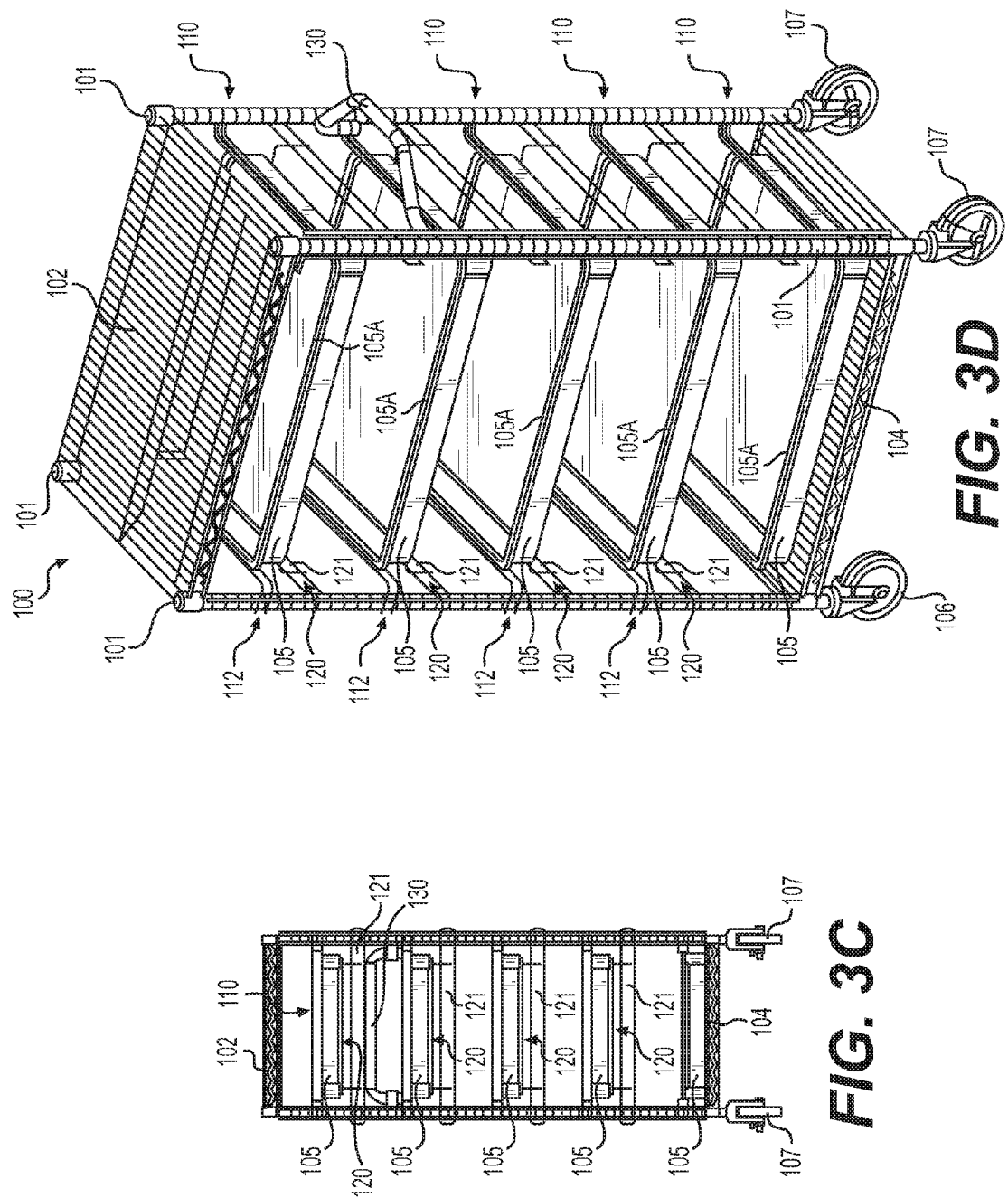

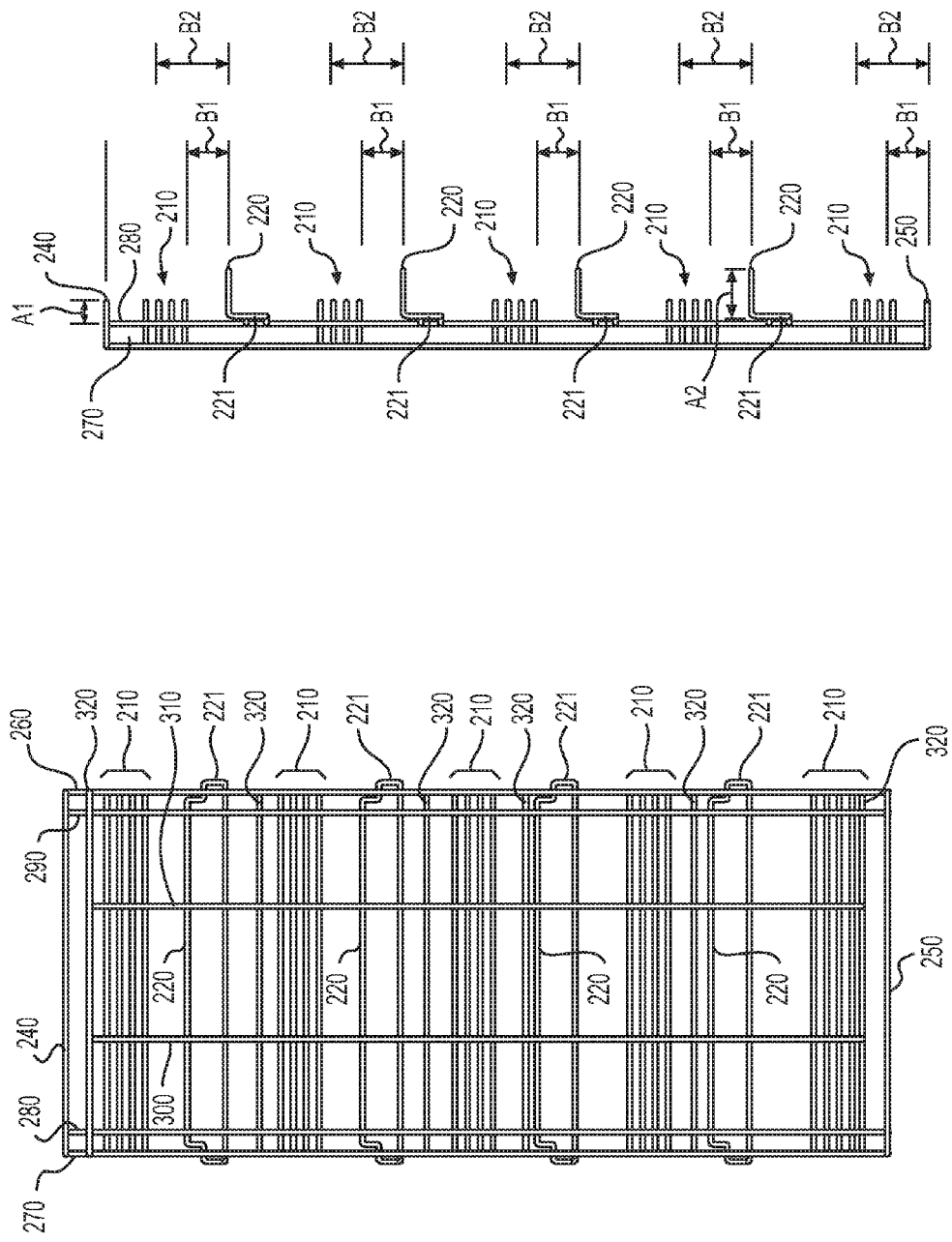

TRAY SUPPORT SYSTEM

BACKGROUND OF THE INVENTION

Field of the Invention

The present invention relates to a tray support system, rack, or cart that supports removable trays. Further, the present invention relates to a novel design of such tray support systems that supports one or more of the trays while preventing tipping or jamming of the trays when pulled forward.

Related Art

Tray support systems or carts commonly comprise a rack system that uses rails to support a plurality of trays on their edges or bottoms. However, tray support systems that support the trays on their edges tend to result in the trays tipping and jamming when pulled forward. In addition, in tray support systems that comprise tall racks that support the trays on their edges, the sides of the rack systems can flex outward to the point that the tray edges lose engagement with the rail(s) and the tray falls between the rails. Moreover, in tray support systems that support at least some of the trays on their bottoms, the same tipping problems can result.

Accordingly, there is a need in the art for a tray support system or cart that comprises a rack system using rails to support one or more trays that reduces the tendency of the trays to tip and jam, and further prevents the trays from disengaging with the rails during flexing of the rails of the system.

BRIEF DESCRIPTION

The present invention provides a tray support system with improved support features.

Further features and advantages of the present invention will become more apparent from the detailed description set forth below when taken in conjunction with the following drawings.

It is an object of the present invention to provide a tray support system that has advantages over conventional systems of a similar kind. The tray support system of the present invention preferably is intended to have improved rail features that support one or more trays while reducing or preventing the tendency of the trays to tip and jam. The improved tray support system also preferably prevents the trays from disengaging with the rails during flexing of the rails of the system.

In a preferred embodiment, the present invention provides a tray support rack for supporting at least one removable tray that includes a tray lip and a bottom surface. The tray support rack includes a top member and a bottom member, and a first frame and a second frame. The first frame extends from the top member to the bottom member on a first side of the tray support rack. The first frame includes (i) at least one first set of parallel rails, each rail of the at least one first set of parallel rails being spaced apart from another rail of the at least one first set of parallel rails to define a first guide space therebetween, the first guide space configured to receive the tray lip of a removable tray, and (ii) at least one first bottom support rail spaced apart from the at least one first set of parallel rails, the at least one first bottom support rail being configured to support the bottom surface of the removable tray. The second frame extends from the top member to the bottom member on a second side of the tray support rack. The second frame includes (i) at least one second set of parallel rails, each rail of the at least one second set of parallel rails being spaced apart from another rail of the at least one second set of parallel rails to define a second guide space therebetween, the second guide space configured to receive the tray lip of a removable tray, and (ii) at least one second bottom support rail spaced apart from the at least one second set of parallel rails, the at least one second bottom support rail being configured to support the bottom surface of the removable tray.

In another preferred embodiment, the present invention provides a tray support rack for supporting at least one removable tray that includes a tray lip, a bottom surface, and a projection with a tab on the bottom surface. The tray support rack includes a top member and a bottom member, and a first frame and a second frame. The first frame extends from the top member to the bottom member on a first side of the tray support rack. The first frame includes (i) at least one first set of parallel rails, each rail of the at least one first set of parallel rails being spaced apart from another rail of the at least one first set of parallel rails to define a first guide space therebetween, the first guide space configured to receive the tray lip of a removable tray, and (ii) at least one first bottom support rail spaced apart from the at least one first set of parallel rails, the at least one first bottom support rail being configured to support the bottom surface of the removable tray and including an offset on an interior edge thereof, the offset being configured to engage with the tab on the bottom surface of the removable tray. The second frame extends from the top member to the bottom member on a second side of the tray support rack. The second frame includes (i) at least one second set of parallel rails, each rail of the at least one second set of parallel rails being spaced apart from another rail of the at least one second set of parallel rails to define a second guide space therebetween, the second guide space configured to receive the tray lip of a removable tray, and (ii) at least one second bottom support rail spaced apart from the at least one second set of parallel rails, the at least one second bottom support rail being configured to support the bottom surface of the removable tray.

In yet another preferred embodiment, the present invention provides a tray support system for supporting at least one removable tray. The tray support system includes a tray support rack and at least one removable tray. The tray support rack includes a top member and a bottom member, and a first frame and a second frame. The first frame extends from the top member to the bottom member on a first side of the tray support rack. The first frame includes (i) at least one first set of parallel rails, each rail of the at least one first set of parallel rails being spaced apart from another rail of the at least one first set of parallel rails to define a first guide space therebetween, and (ii) at least one first bottom support rail spaced apart from the at least one first set of parallel rails, the at least a first bottom support rail being configured to support a bottom surface of a removable tray. The second frame extends from the top member to the bottom member on a second side of the tray support rack. The second frame includes (i) at least one second set of parallel rails, each rail of the at least one second set of parallel rails being spaced apart from another rail of the at least one second set of parallel rails to define a second guide space therebetween, and (ii) at least one second bottom support rail spaced apart from the at least one second set of parallel rails, the at least one second bottom support rail being configured to support a bottom surface of a removable tray. The at least one removable tray (i) includes a tray lip to be inserted within the first and second guide spaces and (ii) is supported by the first and second bottom support rails.

Another preferred feature of the tray support rack and/or system is a bottom support rail that includes an offset on an interior edge of the bottom support rail. The offset of the bottom support rail is configured to engage with a raised projection and tab provided on a bottom surface of a removable tray.

The foregoing and other objects and advantages of the present invention may be more clearly understood from consideration of the following detailed description of the preferred embodiments taken in conjunction with the accompanying drawings.

BRIEF DESCRIPTION OF THE DRAWINGS

FIG. 3A is a top view of the tray support system according to the first embodiment of the invention.

FIG. 3B is a front view of the tray support system according to the first embodiment of the invention.

FIG. 3C is a side view of the tray support system according to the first embodiment of the invention.

FIG. 3D is a top perspective view of the tray support system according to the first embodiment of the invention.

FIG. 6C is a front view of a rail system or frame for use as one of the side rails of the tray support system according to the second embodiment of the invention.

FIG. 6D is a side view of a rail system or frame for use as one of the side rails of the tray support system according to the second embodiment of the invention.

DETAILED DESCRIPTION

Figure 1:
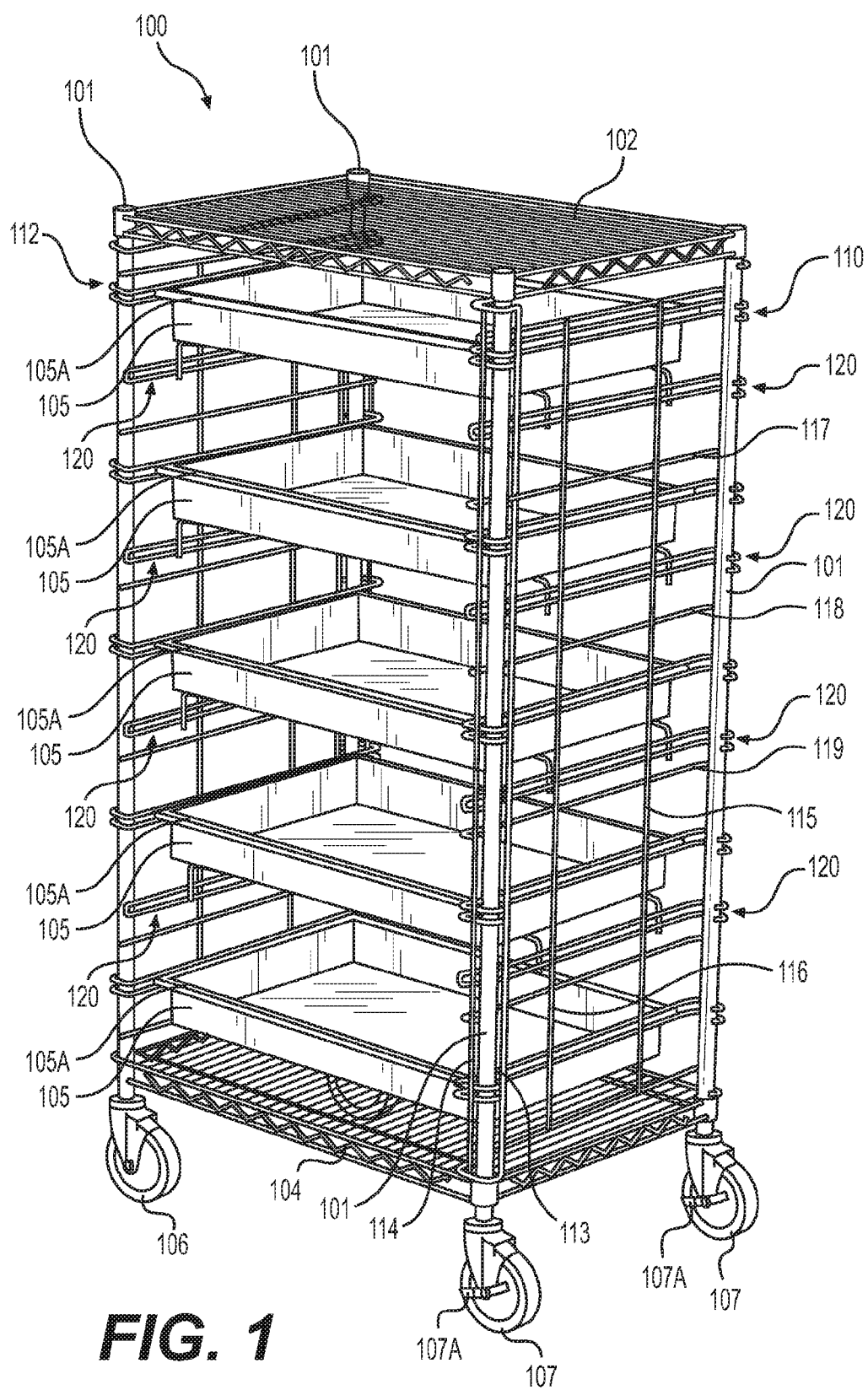
FIG. 1 is a top perspective view of a tray support system according to a first embodiment of the present invention.

The example embodiments of the invention presented herein are directed to an improved tray support system. This is for convenience, and is not intended to limit the application of the present invention. In fact, after reading the following description, it will be apparent to one skilled in the relevant art how to implement the following invention in alternative embodiments, including, for example, stationary tray support systems and tray support systems with one or more trays of various sizes.

FIGS. 1 through 3D show a first embodiment of the present invention. Specifically, the tray support system, rack, or cart 100 in accordance with this embodiment includes four support posts 101. Each post 101 is attached at a top portion of the respective post 101 to a top surface or shelf 102, and each post 101 is further attached at a bottom portion of the respective post 101 to a bottom surface or shelf 104 of the tray support system 100. Each post 101 can optionally include a caster or wheel 106, 107 mounted at its bottom. Each caster 106, 107 may swivel about a vertically aligned axis. Moreover, at least one set of the casters 107 may include a brake 107A that allows for immobilizing the tray support system or cart 100 in a specific place.

The tray support system or cart 100 further includes a rail system or frame for supporting one or more trays 105. The number of trays is not limited and can include one or more trays. Specifically, the frame of the tray support system 100 comprises at least a first pair of parallel rails 110 on a first side of the tray support system 100 and at least a second pair of parallel rails 112 on a second side of the tray support system 100. The first and second pairs of parallel rails 110, 112 are configured to support a lip 105A of a tray 105. In particular, the rails of the first and second pairs of parallel rails 110, 112 are each spaced apart a specific distance to provide a guide space G (see, e.g. FIG. 2) that allows for the lip 105A of the tray 105 to be guided and aligned between the rails of the first and second pairs of parallel rails 110, 112. For example, in one embodiment, a guide space G of 0.090 inches is provided between the rails of the first and second pairs of parallel rails 110, 112. A guide space G can also be created such that a clearance is provided between the upper rail of the each of the first and second pairs of parallel rails 110, 112 and a top edge of the lip 105A of the tray 105. Besides providing a guide space G for the lip 105A of the tray 105, the first and second pairs of parallel rails 110, 112 further provide a motion stop if the tray 105 starts to tip forward. In particular, as a tray 105 is pulled forward along the respective first and second pairs of parallel rails 110, 112, the bottom of the lip 105A of the tray 105 rides along the lower rail of the first and second pairs of parallel rails 110, 112, while the upper rail of the first and second pairs of parallel rails 110, 112 prevents the tray from rotating or flipping forward by engaging with the top of the lip 105A of the tray 105. In one embodiment, the first and second pairs of parallel rails 110, 112 are spaced apart a distance to accommodate three-inch sized trays 105 (meaning, trays with a height or depth of 3 inches). However, the first and second pairs of parallel rails 110, 112 can be configured to accommodate trays of various sizes, including, for example, 3 inch, 4.5 inch, and 6 inch sized trays. Moreover, the first and second pairs of parallel rails 110, 112 are configured to allow for a tray 105 to easily slide along the first and second pairs of parallel rails 110, 112.

As also shown in FIGS. 1, 2, and 3B-3D, bottom support rails 120 are provided to support the bottom surfaces of at least the first four trays 105. Each bottom support rail 120 is connected to the frame of the tray support system 100 via a connector rail 121 that attaches the bottom support rail 120 to the frame (see, e.g., FIG. 2). The bottom support rail 120 extends further inward than either the first or second pairs of parallel rails 110, 112 in order to support the bottom surface of the tray 105 and to ensure that the bottom support rail 120 will support the tray 105 if the lip 105A loses engagement with the first and/or second pairs of parallel rails 110, 112 (see, e.g., FIGS. 2 and 4D). Alternatively, a clearance may be provided between the bottom surface of the tray 105 and the bottom support rail 120 to eliminate friction while sliding the tray 105 in a normal operation.

As shown in FIG. 1, the frame further includes at least a first vertical rail 113 and a second vertical rail 114 that, when assembled, are disposed adjacent to each of the posts 101 of the tray support system 100. Although vertical rails 113, 114 are shown only with respect to one of the posts 101 in FIG. 1, for sake of simplicity, the same structure is preferably provided for all four posts 101. The first and second vertical rails 113, 114 extend from a top portion of a respective post 101 to a bottom portion of the respective post 101. The first and second vertical rails 113, 114 connect to each of the first pairs of parallel rails 110, as well as each of the bottom support rails 120. In the embodiment of FIG. 1, each of the first pairs of parallel rails 110 is shown to wrap around a post 101 on a first end of each of the first pairs of parallel rails 110, and to wrap around another post 101 on a second end of each of the first pairs of parallel rails 110. During assembly, the first and second vertical rails 113, 114, as well as each of the first pairs of parallel rails 110, which can be preformed as an integral frame, are guided onto the posts 101 of the system. This allows for ease of assembly because the frame, as discussed further below, can be initially assembled and thereafter, placed or slid onto the posts 101 of the system. Moreover, the frame can be slid right onto the posts 101 of the system without requiring further fasteners or attachment elements. Accordingly, the first and second vertical rails 113, 114, as well as each of the first pairs of parallel rails 110, are configured to effectively guide the frame onto the respective posts 101 and thus, to stabilize the frame on the posts 101 of the tray support system 100. As noted above, the second side of the tray support system 100 can include a second set of vertical rails that are disposed adjacent to the respective posts 101 of the second side of the tray support system 100, and further connect to each of the second pairs of parallel rails 112 and each of the bottom support rails 120 on that side. Moreover, each of the second pairs of parallel rails 112 is configured to wrap around a post 101 on a first end of each of the second pairs of parallel rails 112, and to wrap around another post 101 on a second end of each of the second pairs of parallel rails 112.

The frame of the tray support system 100 of the embodiment of FIG. 1 can also include at least two stabilizing rails 115, 116 that extend vertically from a top portion of the frame to a bottom portion of the frame. In addition, the frame can include one or more stabilizing rails 117, 118, 119 that extend horizontally along the frame from one post 101 to a second post 101. The stabilizing rails 115-119 are provided to stabilize and strengthen the frame.

As shown in the embodiment of FIG. 1, five trays 105 (e.g., three-inch sized trays) are being supported by the tray support system 100. In particular, each tray 105 has a lip 105A that is supported by a first pair of parallel rails 110 on a first side of the tray support system 100 and a second pair of parallel rails 112 on a second side of the tray support system 100. While this embodiment depicts five trays 105 being supported by the tray support system 100, it will be apparent to one skilled in the relevant art how to configure a frame to support more or less trays 105 on the tray support system 100. The trays are generally made of a polymer or plastic, such as, for example, fiberglass. However, the material used to make the trays is not limited to polymers or plastic.

Figure 2:
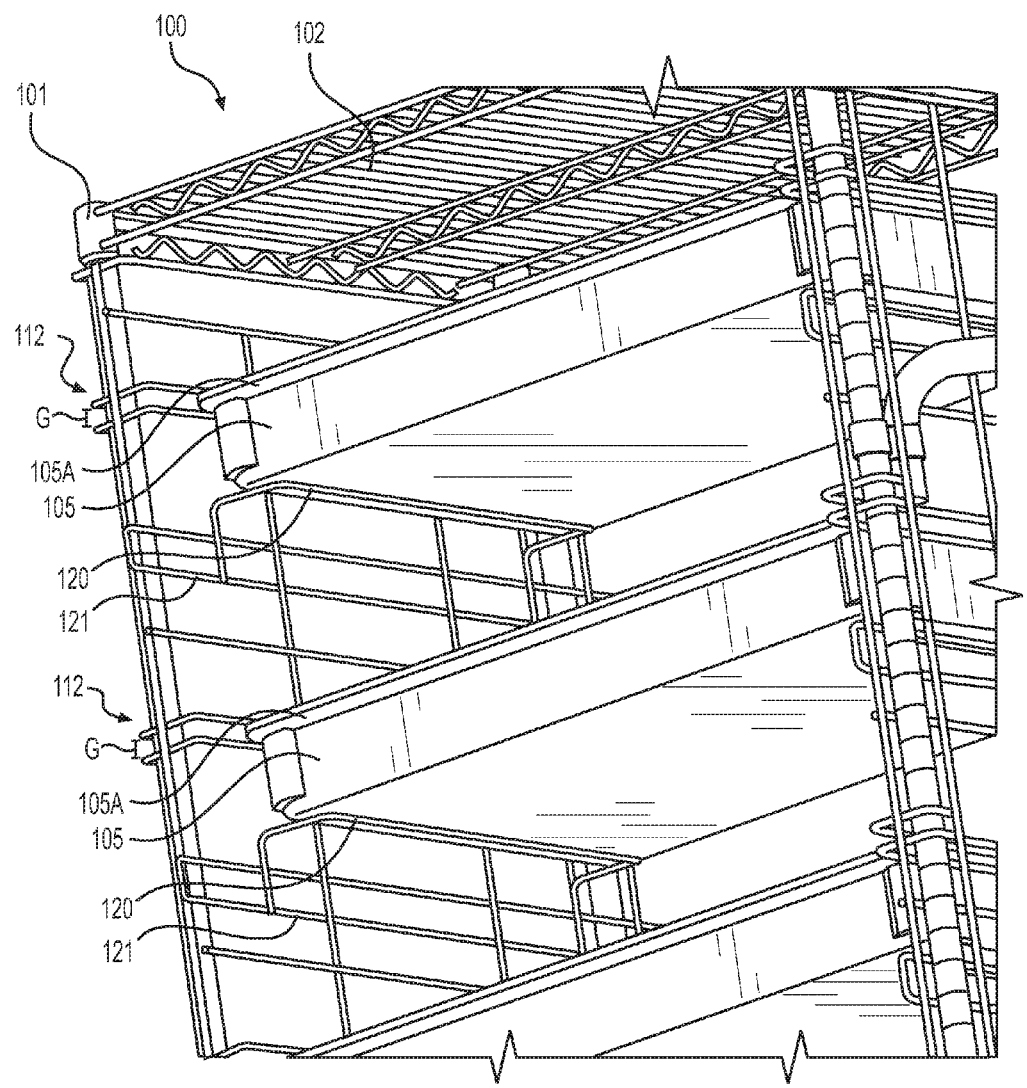
FIG. 2 is a partial isometric view looking upward at the top of the tray support system according to the first embodiment of the present invention.

FIGS. 3A-3D illustrate various views of the tray support system 100 of FIGS. 1 and 2. FIG. 3A is a top view of the tray support system 100, which depicts the top surface or shelf 102 of the tray support system 100 and its attachment to each of the posts 101. FIG. 3A further depicts a handle 130 that will be described in further detail below. FIG. 3B is a front view of the tray support system 100. FIG. 3B depicts five trays 105 that are each being supported by the tray support system 100 via the first and second pairs of parallel rails 110, 112. A bottom support rail 120 is provided underneath each of the bottom surfaces of each of the first four trays 105 on each side of the tray 105 to provide support to the bottom surfaces of the first four trays 105. As discussed above, the bottom support rails 120 are capable of supporting a respective tray 105 in the event that the tray lip 105A loses engagement with one or both of the first and second pairs of parallel rails 110, 112. FIG. 3C is a side view of the tray support system 100 that shows a bottom support rail 120 supporting each of the first four trays 105. Each of the bottom support rails 120 is attached to a respective connector rail 121. As shown in FIGS. 3B and 3C, the fifth or bottom tray 105 is supported by the bottom surface or shelf 104 of the tray support system 100. FIG. 3D is a top perspective view of the tray support system 100. As shown in FIG. 3D, five trays 105 (e.g., three-inch sized trays) are being supported by the tray support system 100. In particular, each tray 105 has a lip 105A that is supported by the first pair of parallel rails 110 on a first side of the tray support system 100 and the second pair of parallel rails 112 on a second side of the tray support system 100. While this embodiment depicts five trays 105 being supported by the tray support system 100, it will be apparent to one skilled in the relevant art how to configure a frame to support more or less trays 105 on the tray support system 100. FIG. 3D also clearly illustrates the handle 130 attached to the tray support system 100. Each end of the handle 130 is attached to a respective post 101 via a clamp (not shown) or other suitable connection. The handle 130 allows for a user to easily maneuver the tray support system 100 or cart when the tray support system 100 is being moved using the casters 106, 107.

Figure 4A:
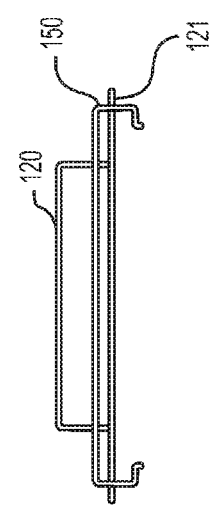
FIG. 4A is a bottom view of a rail system or frame for use as one of the side rails of the tray support system according to the first embodiment of the invention.
Figure 4B:
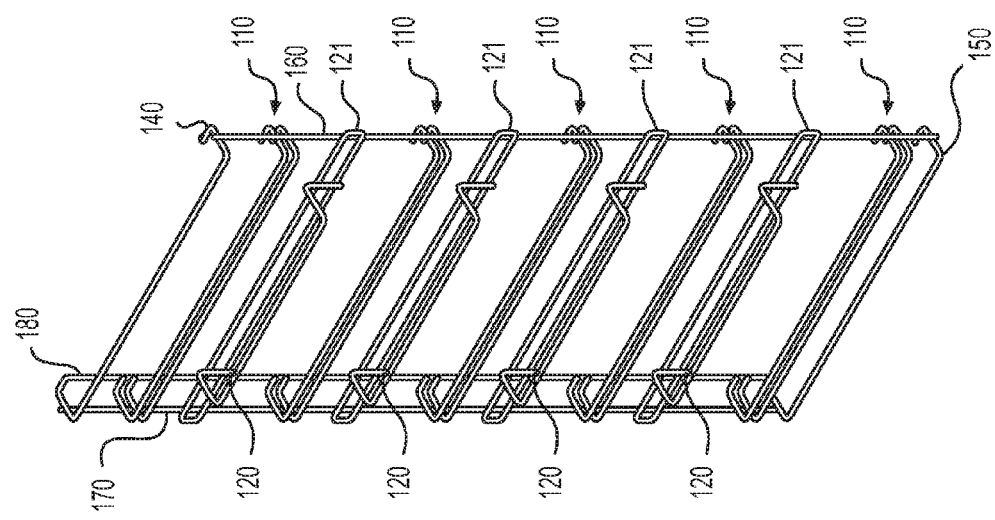
FIG. 4B is a top perspective view of a rail system or frame for use as one of the side rails of the tray support system according to the first embodiment of the invention.
Figure 4D:
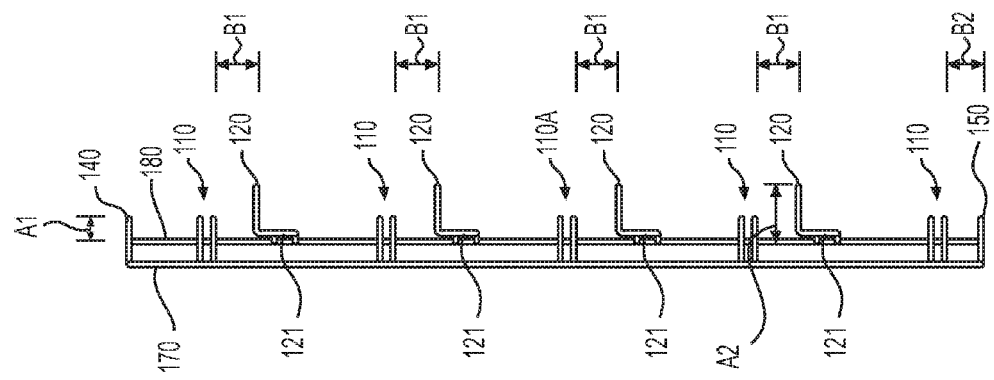
FIG. 4D is a side view of a rail system or frame for use as one of the side rails of the tray support system according to the first embodiment of the invention.
Figure 4C:
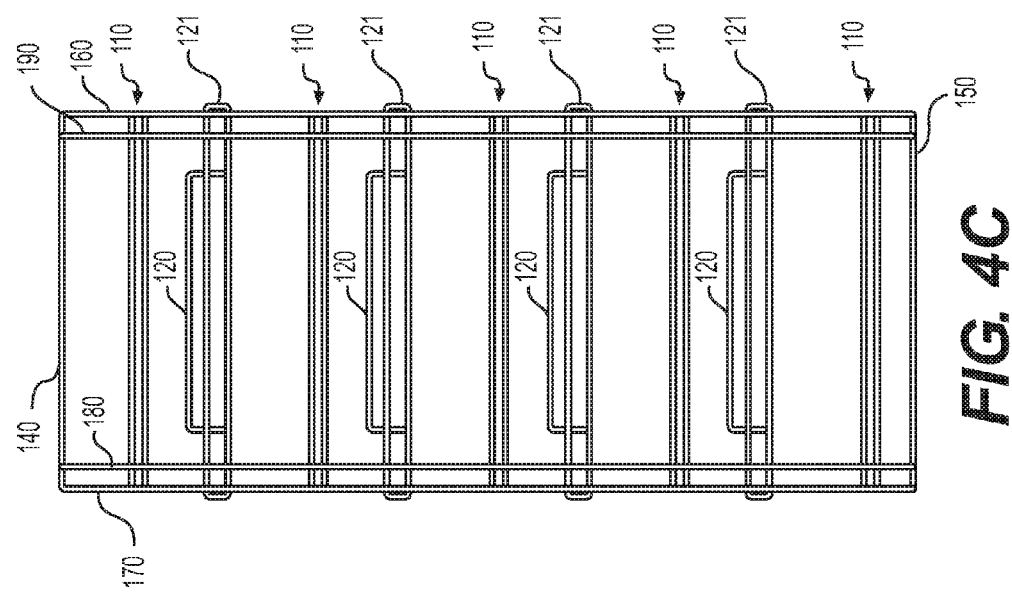
FIG. 4C is a front view of a rail system or frame for use as one of the side rails of the tray support system according to the first embodiment of the invention.

FIGS. 4A-4D illustrate various views of a rail system or frame used with the tray support system 100 of FIGS. 1 through 3D. FIG. 4A is a bottom view of the frame that shows the bottom support rail 120 extending from the connector rail 121. FIG. 4A also shows a lower rail 150, which extends the same distance as each of the first and second pairs of parallel rails 110, 112. Thus, as shown in FIG. 4A, the bottom support rail 120 extends a greater distance than the lower rail 150, as well as each of the first and second pairs of parallel rails 110, 112. FIGS. 4B, 4C, and 4D are a top perspective view, a front view, and a side view of the frame, respectively, that is connected to one side of the tray support system 100. FIGS. 4B-4D illustrate the lower rail 150 of the frame, as well as an upper rail 140. FIGS. 4B-4D also show the plurality of first pairs of parallel rails 110 that are each configured to align and guide a lip 105A of a tray 105. FIGS. 4B-4D also show the plurality of bottom support rails 120 that are each configured to support a bottom surface of a tray 105. Each of the bottom support rails 120 is attached to a respective connector rail 121. Each of the first pairs of parallel rails 110 and connector rails 121 extend from a first vertical rail 160 on one side of the frame to a second vertical rail 170 on an opposite side of the frame.

In the embodiment of FIG. 4B, a second vertical rail 170 and a third vertical rail 180 are provided on the same side of the frame for connecting to each of the first pairs of parallel rails 110 and the connector rails 121. In the embodiment of FIG. 4C, another vertical rail 190 is also provided on the same side of the frame as the first vertical rail 160 for connecting to each of the first pairs of parallel rails 110 and the connector rails 121. Each of the various rails of the frame of FIGS. 4A-4D can be connected to the overall frame using, for example, welding. As shown in FIGS. 1 and 3D, and as discussed above, the frame of FIGS. 4A-4D is easily assembled and guided onto the posts 101 of one side of the tray support system 100 to effectively support and guide the trays 105.

As discussed above, each of the bottom support rails 120 extends a greater distance from the respective vertical rail (e.g., 160-190) than the lower rail 150 or the upper rail 140, as well as each of the first and second pairs of parallel rails 110, 112. In particular, as shown in FIG. 4D, the upper rail 140, as well as each of the first pairs of parallel rails 110 and the lower rail 150, extend a distance A1 from the third vertical rail 180, while each of the bottom support rails 120 extends a distance A2 from the third vertical rail 180. The distance A1 is less than the distance A2 such that the bottom support rails 120 extend a greater distance from the third vertical rail 180. By providing bottom support rails 120 that extend a greater distance than at least the first and second pairs of parallel rails 110, 112, the bottom support rails 120 are capable of supporting the bottom surface of the tray 105, even in the event that the lip 105A of the tray 105 loses engagement with the first and/or second pairs of parallel rails 110, 112. As also shown in FIG. 4D, each of the bottom support rails 120 is positioned a distance B1 from the lower rail of each of the first pairs of parallel rails 120, while the lower rail 150 is positioned a distance B2 from the lower rail of the lowest first pair of parallel rails 120. These distances B1 and B2 relate to the height of the tray 105 utilized with the tray support system 100. For example, if 3 inch sized trays 105 are being used with the tray support system 100, the distances B1 and B2 must be at around 3 inches to allow for the effective placement and alignment of the tray 105 within the guide space G between the first and/or second pairs of parallel rails 110, and above the respective bottom support rail 120 or bottom shelf 104.

Figure 5:
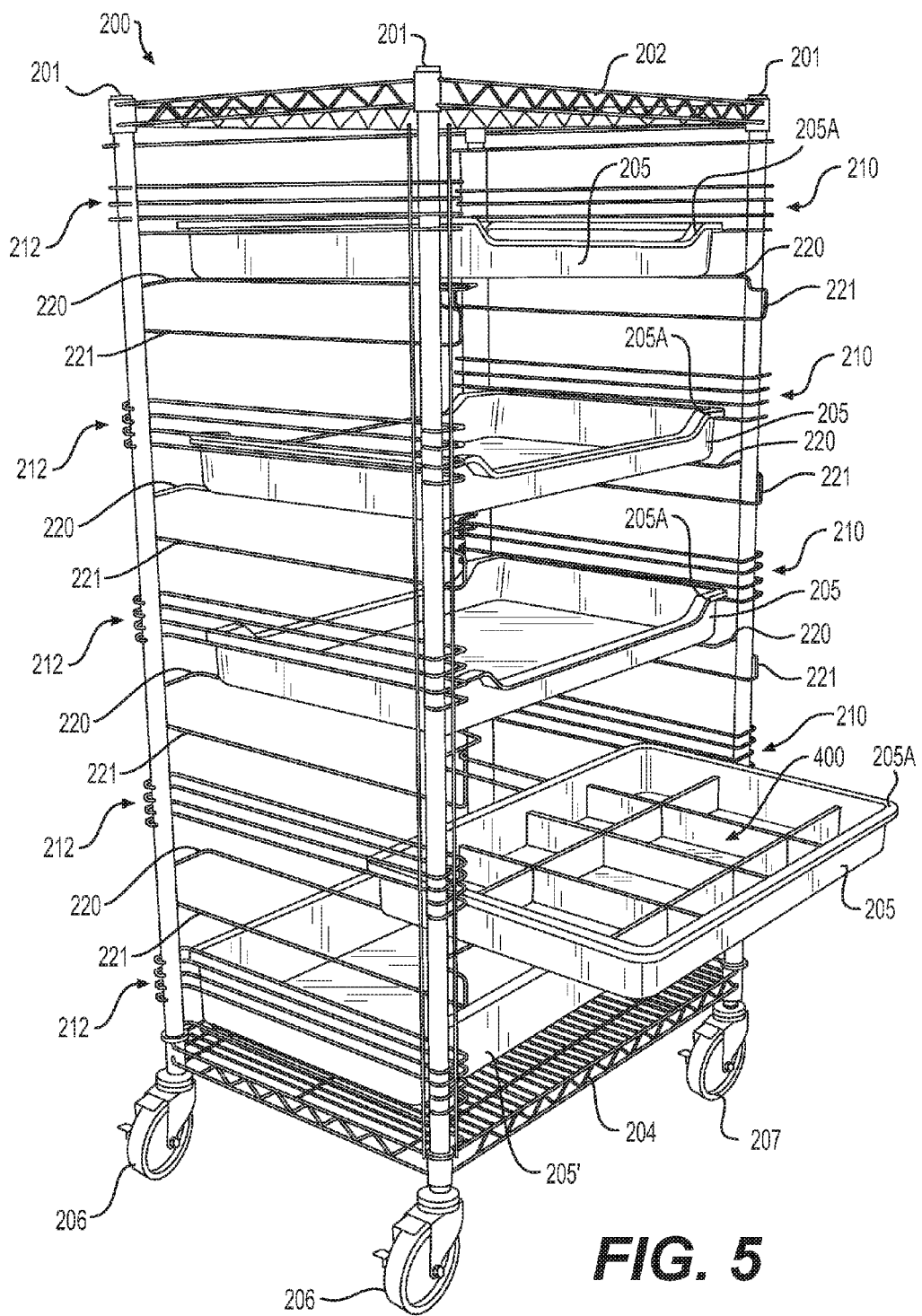
FIG. 5 is a side perspective view of a tray support system according to a second embodiment of the present invention.
Figure 6A:
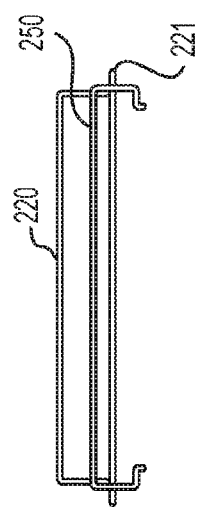
FIG. 6A is a bottom view of a rail system or frame for use as one of the side rails of the tray support system according to the second embodiment of the invention.
Figure 6B:
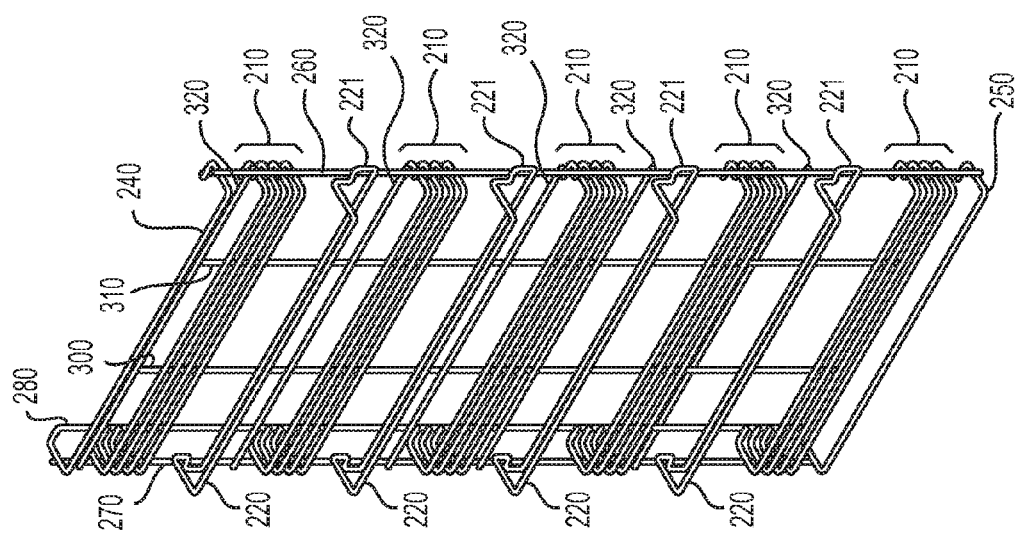
FIG. 6B is a top perspective view of a rail system or frame for use as one of the side rails of the tray support system according to the second embodiment of the invention.
Figure 7:
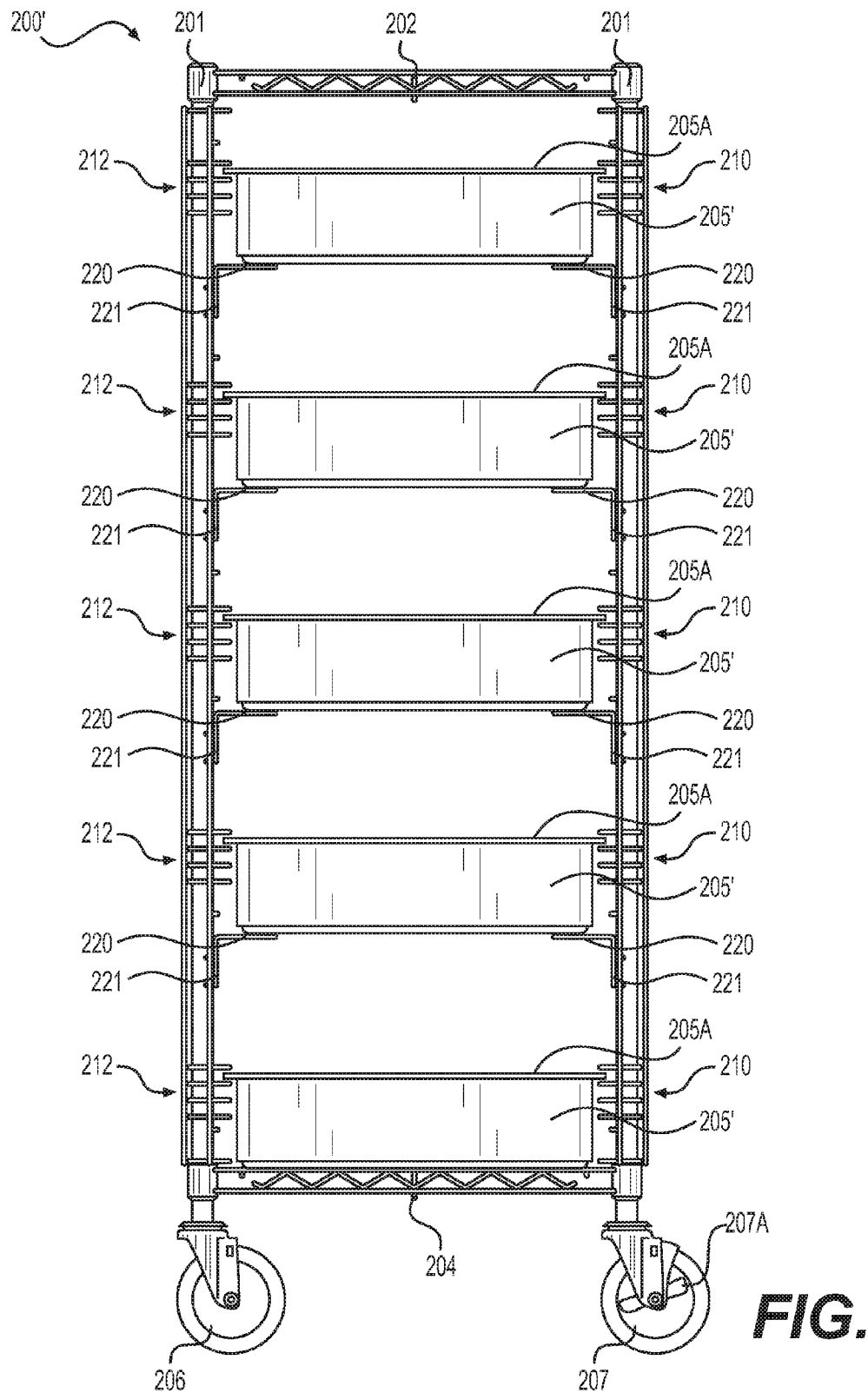
FIG. 7 is a front view of the tray support system according to the second embodiment of the invention.

FIGS. 5 through 7 show a second embodiment of the present invention. Specifically, a tray support system or cart 200 in accordance with this embodiment includes four support posts 201. Each post 201 is attached at a top portion of the respective post 201 to a top surface or shelf 202, and each post 201 is further attached at a bottom portion of the respective post 201 to a bottom surface or shelf 204 of the tray support system 200. Each post 201 also includes a caster or wheel 206, 207 mounted at its bottom. Each caster 206, 207 may swivel about a vertically aligned axis. Moreover, at least one set of the casters 206, 207 may include a brake that allows for immobilizing the tray support system or cart 200 in a specific place.

The tray support system or cart 200 further includes a rail system or frame for supporting a plurality of trays 205, 205'. Specifically, the frame of the tray support system 200 comprises at least a first set of parallel rails 210 on a first side of the tray support system 200 and at least a second set of parallel rails 212 on a second side of the tray support system 200. The first and second sets of parallel rails 210 and 212 are configured to support a lip 205A of a tray 205, 205'. In particular, each of the first and second sets of parallel rails 210, 212 includes at least four parallel rails that are each spaced apart a specific distance to provide a guide space G (see, e.g., FIG. 2) therebetween that allows for the lip 205A of the tray 205, 205' to be guided and aligned between the rails of the first and second sets of parallel rails 210, 212. Moreover, by providing a set of parallel rails (e.g., 210 and 212), trays 205, 205' of various sizes and configurations, such as, for example, 3 inch, 4.5 inch, and 6 inch trays, can be accommodated within the same set of parallel rails (e.g., 210 and 212) by placing the lip 205A of the tray 205, 205' within the appropriate guide space G provided between the various rails of the first and second sets of parallel rails 210, 212. For example, in the embodiment of FIG. 5, the first four upper trays 205 are 3 inch sized trays; thus, the lip 205A of each of these trays 205 is aligned and guided within the guide space G provided between the lower two rails of each of the first and second sets of parallel rails 210, 212. However, in the embodiment of FIG. 5, the bottom tray 205' is a 4.5 inch tray; thus, the lip 205A of this tray 205' is aligned and guided within the guide space G provided between the upper two rails of each of the first and second sets of parallel rails 210, 212. Besides providing a guide space G for the lip 205A of the tray 205, 205', the first and second sets of parallel rails 210, 212 further provide a motion stop if the tray 205, 205' starts to tip forward. Specifically, as discussed above, as a tray 205, 205' is pulled forward along the respective first and second sets of parallel rails 210, 212, the bottom of the lip 205A of the tray 205, 205' rides along a lower rail of the first and second sets of parallel rails 210, 212, while an upper rail of the first and second sets of parallel rails 210, 212 prevents the tray from rotating or flipping forward by engaging with the top of the lip 205A of the tray 205, 205'. Moreover, the first and second sets of parallel rails 210, 212 are configured to allow for a tray 205, 205' to easily slide along the first and second sets of parallel rails 210, 212.

In the embodiment of FIGS. 5 through 7, a plurality of bottom support rails 220 are also provided to support the bottom surface of each of the trays 205. Each of the bottom support rails 220 is connected to the frame of the tray support system 200 via a connector rail 221 that attaches the respective bottom support rail 220 to the frame. In addition, as in the embodiment of FIG. 2, each of the bottom support rails 220 of FIG. 5 extends further inward than each of the rails of the first and second sets of parallel rails 210, 212 in order to support the bottom surface of the tray 205 and to ensure that the bottom support rail 220 will support the tray 205 if the lip 205A loses engagement with either of the sets of parallel rails 210, 212. Alternatively, a clearance can be provided between the bottom surface of the tray 205 and the bottom support rail 220 to eliminate friction while sliding the tray 205 in a normal operation. As shown in FIG. 5, the fifth or bottom tray 205' can be supported by the bottom surface or shelf 204 of the tray support system 200.

As shown in the embodiment of FIG. 5, five trays 205, 205' are being supported by the tray support system 200. In particular, each tray 205, 205' has a lip 205A that is supported by a first set of parallel rails 210 on a first side of the tray support system 200 and a second set of parallel rails 212 on a second side of the tray support system 200. A bottom support rail 220 is provided underneath each of the bottom surfaces of each of the first four trays 205 on each side of the tray 205 to support the bottom surfaces of the first four trays 205. As discussed above, the bottom support rails 220 are also capable of supporting a respective tray 205 in the event that the tray lip 205A loses engagement with one or both of the first and second sets of parallel rails 210, 212. While this embodiment depicts five trays 205, 205' being supported by the tray support system 200, it will be apparent to one skilled in the relevant art how to configure a frame to support more or fewer trays 205, 205' on the tray support system 200. The trays are generally made of a polymer or plastic, such as, for example, fiberglass. However, the material used to make the trays is not limited to polymers or plastic. In the embodiment of FIG. 5, one of the trays 205, which includes dividers 400 within the tray 205, is shown in a forward position after being pulled along the respective rails of the first and second sets of parallel rails 210, 212. As shown in FIG. 5, the tray 205 is not tipping forward, as can occur in conventional tray support systems, because the tray 205 is being supported by one or both of the first and second sets of parallel rails 210, 212 and the bottom support rail 220.

FIGS. 6A-6D illustrate various views of a rail system or frame used with the tray support system 200 of FIG. 5. FIG. 6A is a bottom view of the frame that shows the bottom support rail 220 extending from the connector rail 221. FIG. 6A also shows a lower rail 250, which extends the same distance as each of the first and second sets of parallel rails 210, 212. Thus, as shown in FIG. 6A, the bottom support rail 220 extends a greater distance than the lower rail 250, as well as each of the sets of parallel rails 210, 212. FIGS. 6B, 6C, and 6D are a top perspective view, a front view, and a side view of the frame, respectively, that is connected to one side of the tray support system 200. FIGS. 6B-6D illustrate the lower rail 250 of the frame, as well as an upper rail 240. FIGS. 6B-6D also show a plurality of first sets of parallel rails 210 that are each configured to align and guide a lip 205A of a tray 205, 205'. FIGS. 6B-6D also show a plurality of bottom support rails 220 that are each configured to support a bottom surface of a tray 205. Each of the bottom support rails 220 are attached to a respective connector rail 221. Each of the first sets of parallel rails 210 and connector rails 221 extend from a first vertical rail 260 on one side of the frame to a second vertical rail 270 on an opposite side of the frame. In the embodiment of FIG. 6B, a second vertical rail 270 and a third vertical rail 280 are provided on the same side of the frame for connecting to each of the first sets of parallel rails 210 and the connector rails 221. In the embodiment of FIG. 6C, another vertical rail 290 is also provided on the same side of the frame as the first vertical rail 260 for connecting to each of the first sets of parallel rails 210 and the connector rails 221. FIGS. 6B and 6C also show two stabilizing rails 300, 310 that extend vertically from a top portion of the frame to a bottom portion of the frame. In addition, the frame can include one or more stabilizing rails 320 that extend horizontally along the frame from the first vertical rail 260 to the second vertical rail 270. The stabilizing rails 300, 310, 320 are provided to stabilize and to strengthen the frame. Each of the various rails of the frame of FIGS. 6A-6D can be connected to the overall frame using, for example, welding. As shown in, for example, FIGS. 5 and 7, the frame of FIGS. 6A-6D is easily assembled and guided onto the posts 201 of one side of the tray support system 200 (as in the first embodiment) to effectively support and guide the trays 205, 205'.

As discussed above, each of the bottom support rails 220 extends a greater distance from the respective vertical rail (e.g., 260-290) than the lower rail 250 or the upper rail 240, as well as each of the first and second sets of parallel rails 210, 212. In particular, as shown in FIG. 6D, the upper rail 240, as well as each of the first sets of parallel rails 210 and the lower rail 250, extend a distance A1 from the third vertical rail 280, while each of the bottom support rails 220 extends a distance A2 from the third vertical rail 280. The distance A1 is less than the distance A2 such that the bottom support rails 220 extend a greater distance from the third vertical rail 280. By providing bottom support rails 220 that extend a greater distance than at least the first and second sets of parallel rails 210, 212, the bottom support rails 220 are capable of supporting the bottom surface of the tray 205, even in the event that the lip 205A of the tray 205 loses engagement with the first and/or second sets of parallel rails 210, 212. As also shown in FIG. 6D, each of the bottom support rails 220, as well as the lower rail 250, is positioned a distance B1 from the fourth or lowest rail of each of the first sets of parallel rails 210. Each of the bottom support rails 220, as well as the lower rail 250, is also positioned a distance B2 from the second rail of each of the first sets of parallel rails 220. These distances B1 and B2 relate to the height of the trays 205, 205' utilized with the tray support system 200. For example, if 3 inch sized trays 205 are being used with the tray support system 200, the distance B1 must be around 3 inches to allow for effective placement of the tray 205 within the guide space G between the lower rails of the first and/or second sets of parallel rails 210, and above the respective bottom support rail 220 or bottom shelf 204. Moreover, if 4.5 inch sized trays 205' are being used with the tray support system 200, the distance B2 must be around 4.5 inches to allow for effective placement of the tray 205' within the guide space G between the upper rails of the first and/or second sets of parallel rails 210, and above the respective bottom support rail 220 or bottom shelf 204.

FIG. 7 depicts the second embodiment of a tray support system 200' in which a plurality of deeper (e.g., 4.5 inch) trays 205' are being supported. The same reference numerals are used to depict the same parts that are included with this embodiment. As shown in the embodiment of FIG. 7, each of the lips 205A of the trays 205' is supported between the upper two rails of the first and second sets of parallel rails 210, 212. The first four trays 205' are also supported on their bottom surfaces by a respective bottom support rail 220 on each side of the tray 205', while the fifth or bottom tray 205' is supported by the bottom surface or shelf 204 of the tray support system 200'. As discussed above, the bottom support rails 220 are further capable of supporting a respective tray 205' in the event that the tray lip 205A loses engagement with one or both of the first and second sets of parallel rails 210, 212. The fifth or bottom tray 205' can also be supported by the bottom surface or shelf 204 of the tray support system 200' in the event that this tray 205' loses engagement with the first and/or second sets of parallel rails 210, 212. While this embodiment depicts five trays 205' of the same size (e.g., 4.5-inch trays) being supported by the tray support system 200', it will be apparent to one skilled in the relevant art how to position trays 205, 205' of various sizes, as discussed above, as well as how to configure a frame to support more or fewer trays 205' of various sizes on the tray support system 200'.

Figure 8:
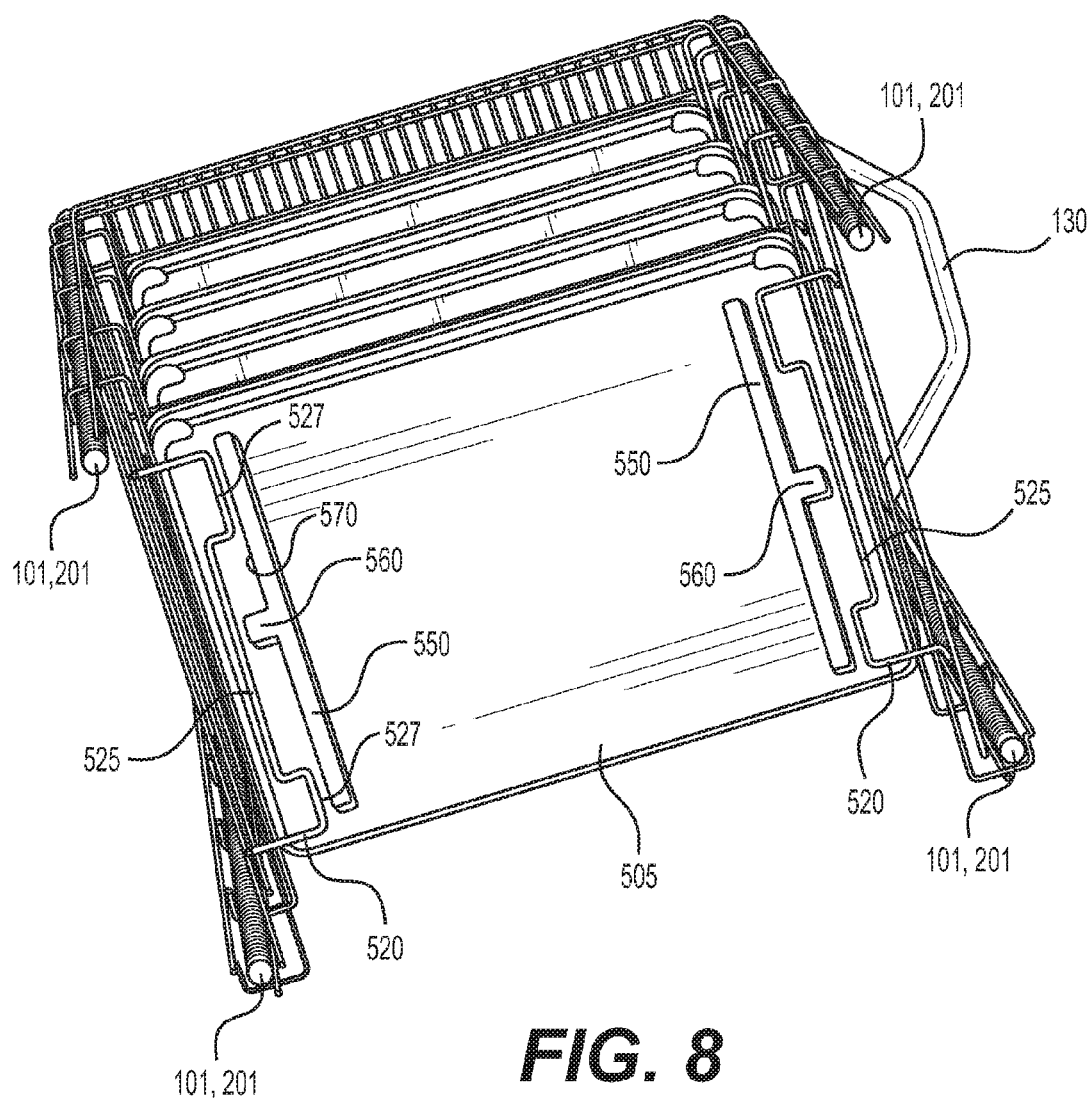
FIG. 8 is a bottom perspective view of a tray support system according to a third embodiment of the present invention.

FIG. 8 shows a third embodiment of the present invention. Specifically, FIG. 8 illustrates an alternative configuration for the bottom support rails 520 and the trays 505. In particular, the bottom support rail 520 includes an offset 525 that is configured to engage with a tab 560 provided on a raised projection 550 that is formed on a bottom surface of the tray 505. The offset 525 is created by including two inward bends, preferably at 90 degree angles, along an interior edge of the bottom support rail 520. The offset 525 of the bottom support rail 520 functions as a stop at each end of the offset 525, by engaging with the tab 560 of the projection 550. Accordingly, the engagement of the tab 560 with the offset 525 prevents the tray 505 from being pulled free from the tray support system during a normal sliding operation. The raised projection 550 is formed linearly along an insertion direction of the tray 505. Exterior edges 570 of the projection 550 can be configured to be guided by guide sections 527 of the bottom support rail 520. Moreover, the projection 550 and tab 560 are configured to have a height from the bottom surface of the tray 505 that allows for the tray 505 to be inserted into the tray support system with a slight interference between the tab 560 and the offset 525, but with a height that is high enough to allow for the offset 525 to act as a stopping mechanism when engaging with the tab 560 of the projection 550. For example, the raised projection 550 and tab 560 have a height from the bottom surface of the tray 505 such that the tab 560 will engage with the edges of the offset 525 when the tray is slid forward on either the front or back side of the tray support system. In one embodiment, the height of the raised projection 550 and tab 560 is preferably 0.25 inches from the bottom surface of the tray 505. This engagement of the tab 560 with the offset 525 prevents the tray 505 from being pulled free from the tray support system during a normal sliding operation, without excessive force. However, the raised projection 550 and tab 560 have a height from the bottom surface of the tray 505, and the bottom support rail 520 is positioned a specific distance from respective parallel rails (e.g., 110, 112, 210, 212), such that the tray 505 may be inserted or removed by a user into the tray support system with a slight interference between the bottom support rail 520 and the raised projection 550 and tab 560 by slightly raising the tray during the insertion or removal from the system. For example, in one embodiment, the height of the raised projection 550 and tab 560 is preferably 0.25 inches from the bottom surface of the tray 505, while the bottom support rail 520 is positioned a distance of at least 3 inches from the respective parallel rails. As discussed above, the inclusion of the raised projection 550 and tab 560 on the bottom surface of the tray(s) 505, as well as the inclusion of the modified bottom support rail(s) 520 with an offset 525, allows for the tray(s) 505 to be accessed from either the front or back side of the tray support system, while affording the stopping feature regardless of which side is chosen. In the embodiment of FIG. 8, the raised projection 550 with the tab 560 is provided on both sides of the bottom surface of the tray 505. However, a single projection 550 with a tab 560 may be provided on only one side of the bottom surface of the tray 505. In addition, in the embodiment of FIG. 8, the bottom support rail 520 with offset 525 is included on both sides of the frame. However, only one side of the frame may include a bottom support rail 520 with an offset 525, while the other side can include the previously disclosed bottom support rails (e.g., 120, 220).

Figure 9:
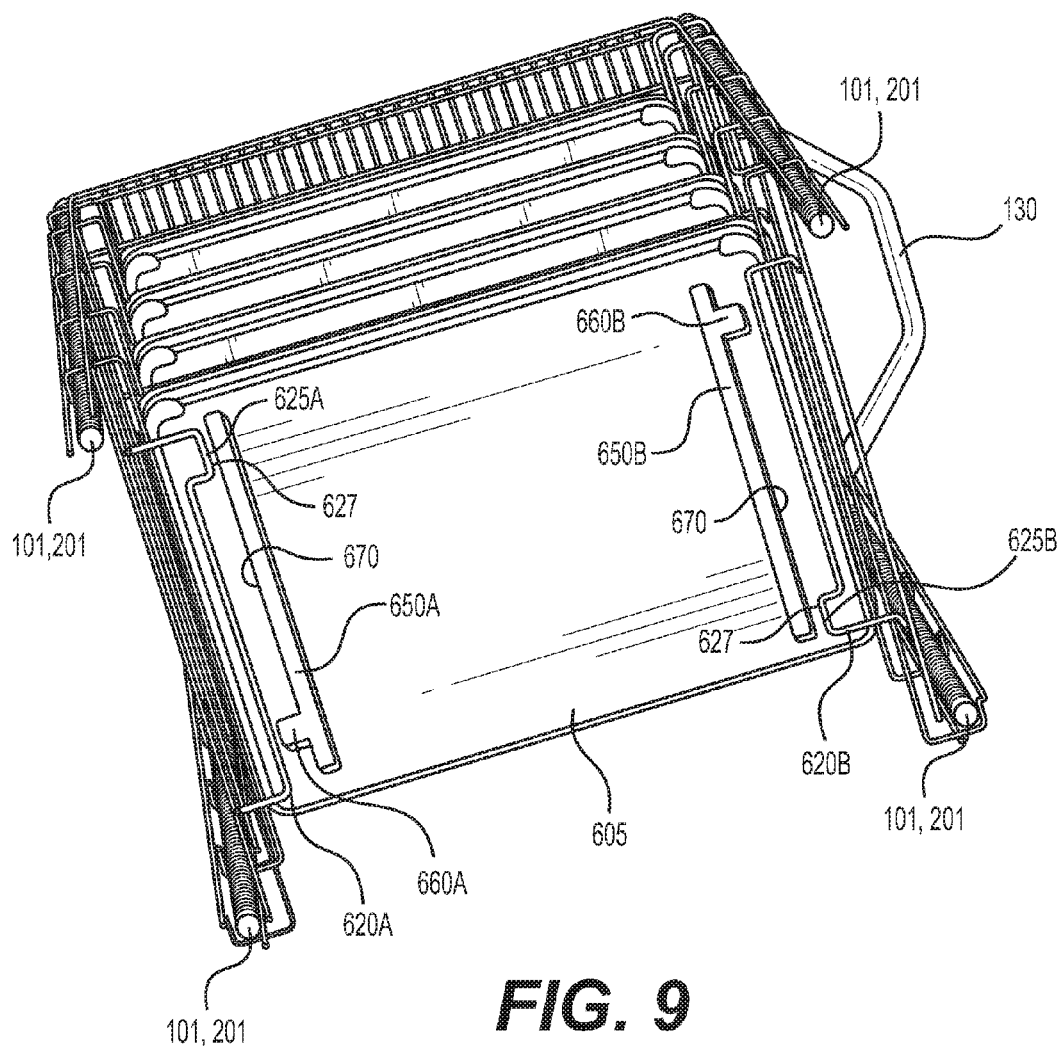
FIG. 9 is a bottom perspective view of a tray support system according to an alternative configuration of the third embodiment of the present invention.

FIG. 9 depicts an alternative configuration of the third embodiment of the present invention. Specifically, FIG. 9 illustrates another alternative configuration for the bottom support rails 620A, 620B and the trays 605. In particular, the bottom support rail 620A, 620B includes an offset 625A, 625B that is configured to engage with a tab 660A, 660B provided on a raised projection 650A, 650B that is formed on a bottom surface of the tray 605. The offset 625A, 625B, in this embodiment, is created by including a single inward bend, preferably at a 90 degree angle, along an interior edge of the bottom support rail 620A, 620B. The offset 625A, 652B of the bottom support rail 620A, 620B functions as a stop by engaging with the tab 660A, 660B of the projection 650A, 650B. In particular, as shown in FIG. 9, a first offset 625A is provided on one side of the interior edge of a first bottom support rail 620A, while a second offset 625B is provided on an opposing side of the interior edge of a second bottom support rail 620B. In addition, in this embodiment, a first raised projection 650A is provided on one side of the tray 605 and includes a first tab 660A that is closer to one end of the first projection 650A, while a second projection 650B is provided on an opposing side of the tray 605 and includes a second tab 660B that is closer to one end of the second projection 650B, such that the first tab 660A is on an end of the first projection 650A that opposes the end of the second projection 650B on which the second tab 660B is provided. During a normal sliding operation, the engagement of the tab 660A, 660B with the respective offset 625A, 625B prevents the tray 605 from being pulled free from the tray support system, without excessive force. The first and second raised projections 650A, 650B are formed linearly along an insertion direction of the tray 605. Exterior edges 670 of the first and second projections 650A, 650B can be configured to be guided by guide sections 627 of the first and second bottom support rails 620A, 620B. Moreover, the first and second projections 650A, 650B and the first and second tabs 660A, 660B are configured to have a height from the bottom surface of the tray 605 that allows for the tray 605 to be inserted into the tray support system with a slight interference between the tabs 660A, 660B and the respective offsets 625A, 625B, but with a height that is high enough to allow for the offsets 625A, 625B to act as a stopping mechanism when engaging with the tabs 660A, 660B of the projections 650A, 650B. For example, the raised projections 650A, 650B and tabs 660A, 660B have a height from the bottom surface of the tray 605 such that the tabs 660A, 660B will engage with the edges of the respective offsets 625A, 625B when the tray is slid forward on either the front or back side of the tray support system. In one embodiment, the height of the raised projections 650A, 650B and tabs 660A, 660B is preferably 0.25 inches from the bottom surface of the tray 605. This engagement of the tabs 660A, 660B with the respective offsets 625A, 625B prevents the tray 605 from being pulled free from the tray support system during a normal sliding operation, without excessive force. However, the raised projections 650A, 650B and tabs 660A, 660B, as discussed above, have a height from the bottom surface of the tray 605, and the bottom support rails 620A, 620B are positioned a specific distance from respective parallel rails (e.g., 110, 112, 210, 212), such that the tray 605 may be inserted or removed by a user into the tray support system with a slight interference between the bottom support rails 620A, 620B and the raised projections 650A, 650B and tabs 660A, 660B by slightly raising the tray during the insertion or removal from the system. For example, in one embodiment, the height of the raised projections 650A, 650B and tabs 660A, 660B is preferably 0.25 inches from the bottom surface of the tray 605, while the bottom support rails 620A, 620B are positioned a distance of at least 3 inches from the respective parallel rails. As discussed above, the inclusion of the raised projections 650A, 650B and tabs 660A, 660B on the bottom surface of the tray(s) 605, as well as the inclusion of the modified bottom support rails 620A, 620B with the offsets 625A, 625B, allows for the tray(s) 605 to be accessed from either the front or back side of the tray support system, while affording the stopping feature regardless of which side is chosen.

With the tray support system or cart of the present invention, there are notable advantages over other tray support systems or carts known in the art. The tray support system or cart of the invention incorporates improved rail features that support a plurality of trays while reducing or preventing the tendency of the trays to tip and jam. The improved tray support system also preferably prevents the trays from disengaging with the rails during flexing of the rails of the system.

While various example embodiments of the invention have been described in detail above, it should be understood that they have been presented by way of example for purposes of illustration, and not limitation. It is apparent to persons skilled in the relevant art(s) that various changes in form and detail can be made therein. Modifications may be made to the preferred embodiments of the tray support system described above without departing from the scope of the present invention. Thus, the disclosure should not be limited by any of the above described example embodiments.

We claim:

1. A tray support rack for supporting at least one removable tray, the at least one removable tray including a tray lip and a bottom surface, the tray support rack comprising:
   a top member;
   a bottom member;
   a first frame that extends from the top member to the bottom member on a first side of the tray support rack, the first frame including (i) at least one first set of parallel rails, each rail of the at least one first set of parallel rails being spaced apart from another rail of the at least one first set of parallel rails to define a first guide space therebetween, the first guide space configured to receive the tray lip of the at least one removable tray, and (ii) at least one first bottom support rail spaced apart from the at least one first set of parallel rails, the at least one first bottom support rail being configured to support the bottom surface of the at least one removable tray; and
   a second frame that extends from the top member to the bottom member on a second side of the tray support rack, the second frame including (i) at least one second set of parallel rails, each rail of the at least one second set of parallel rails being spaced apart from another rail of the at least one second set of parallel rails to define a second guide space therebetween, the second guide space configured to receive the tray lip of the at least one removable tray, and (ii) at least one second bottom support rail spaced apart from the at least one second set of parallel rails, the at least one second bottom support rail being configured to support the bottom surface of the at least one removable tray;
   wherein the bottom surface of the at least one removable tray comprises at least one protection comprising a tab;
   wherein at least one of the at least one first bottom support rail and the at least one second bottom support rail comprises an offset on an interior edge thereof; and
   wherein the tab of the at least one protection engages the offset when the removable tray is supported in the tray support rack.

2. The tray support rack of claim 1, further comprising a plurality of first sets of parallel rails and a plurality of second sets of parallel rails, wherein each set of parallel rails comprises at least one parallel rail that is spaced apart from another parallel rail to define a respective guide space therebetween.

3. The tray support rack of claim 2, further comprising a plurality of first bottom support rails that are each spaced apart from a respective first set of parallel rails and a plurality of second bottom support rails that are each spaced apart from a respective second set of parallel rails.

4. The tray support rack of claim 1, wherein the first and second sets of parallel rails each comprise at least two pairs of parallel rails.

5. The tray support rack of claim 1, wherein each of the first and second bottom support rails extends further inward from the respective side of the tray support rack than the parallel rails of the first and second sets of parallel rails.

6. The tray support rack of claim 1, wherein the bottom surface of the at least one removable tray comprises a first projection comprising a first tab and a second projection comprising a second tab;
   wherein the first bottom support rail includes a first offset on an interior edge thereof and the second bottom support rail includes a second offset on an interior edge thereof; and
   wherein the first tab engages the first offset and the second tab engages the second offset when the removable tray is supported in the tray support rack.

7. A tray support system for supporting at least one removable tray, the tray support system comprising:
   (a) a tray support rack that includes:
      a top member;
      a bottom member;
      a first frame that extends from the top member to the bottom member on a first side of the tray support rack, the first frame including (i) at least one first set of parallel rails, each rail of the at least one first set of parallel rails being spaced apart from another rail of the at least one first set of parallel rails to define a first guide space therebetween, and (ii) at least one first bottom support rail spaced apart from the at least one first set of parallel rails, the at least one first bottom support rail being configured to support a bottom surface of the removable tray; and
      a second frame that extends from the top member to the bottom member on a second side of the tray support rack, the second frame including (i) at least one second set of parallel rails, each rail of the at least one second set of parallel rails being spaced apart from another rail of the at least one second set of parallel rails to define a second guide space therebetween, and (ii) at least one second bottom support rail spaced apart from the at least one second set of parallel rails, the at least one second bottom support rail being configured to support a bottom surface of a removable tray; and
   (b) at least one removable tray, wherein the at least one removable tray (i) includes a tray lip to be inserted within the first and second guide spaces and (ii) is supported by the first and second bottom support rails;
   wherein at least one of the first and second bottom support rails includes an offset on an interior edge thereof, and the at least one removable tray includes at least one projection with a tab on a bottom surface thereof, the offset being configured to engage with the tab on the bottom surface of the at least one removable tray.

8. The tray support system of claim 7, further comprising a plurality of first sets of parallel rails and a plurality of second sets of parallel rails, wherein each set of parallel rails comprises at least one parallel rail that is spaced apart from another parallel rail to define a respective guide space therebetween.

9. The tray support system of claim 8, further comprising a plurality of first bottom support rails that are each spaced apart from a respective first set of parallel rails and a plurality of second bottom support rails that are each spaced apart from a respective second set of parallel rails.

10. The tray support system of claim 7, wherein the first and second sets of parallel rails each comprise at least two pairs of parallel rails.

11. The tray support system of claim 7, wherein each of the first and second bottom support rails extends further inward from the respective side of the tray support rack than the parallel rails of the first and second sets of parallel rails.

12. The tray support system of claim 7, wherein the at least one projection is guided by the at least one of the first and second bottom support rails in an insertion direction.

13. The tray support system of claim 7, wherein the at least one removable tray includes two projections on the bottom surface thereof, the two projections being disposed on opposing sides of the bottom surface of the at least one removable tray.

14. The tray support system of claim 7, wherein an interference is created between the at least one projection with the tab and the at least one of the first and second bottom rails upon insertion and removal of the at least one removable tray.

15. A tray support system comprising:
   a tray support rack comprising a first frame on a first side of the support rack and a second frame on a second side of the support rack;
   the first frame comprising a plurality of parallel first rails, each first rail being spaced vertically apart from another first rail to define a first guide space, and a first support rail spaced vertically below the first rails and comprising a first inner edge and a first offset;
   the second frame comprising a plurality of parallel second rails, each second rail being spaced vertically apart from another second rail to define a second guide space and a second support rail spaced vertically below the second rails and comprising a second inner edge and a second offset;
   a tray comprising a lip extending about a periphery of the tray, a bottom surface, a first raised projection extending from the bottom surface and comprising a first tab, and a second raised projection extending from the bottom surface and comprising a second tab;
   wherein the tray is supported in the tray support rack such that the lip of the tray is received in the first guide space and the second guide space, the bottom of the tray is slidably movable forward and backward on the first and second support rails between a first position and a second position, the first projection engages the first inner edge of the first support rail and the second projection engages the second inner edge of the second support rail;
   wherein when the tray is moved to a first position, at least one of the first tab and the second tab engages, respectively, at least one of the first offset of the first support rail and the second offset of the second support rail; and
   wherein when the tray is moved to a second position, at least the other of the first tab and the second tab engages, respectively, at least the other of the first offset of the first support rail and the second offset of the second support rail.

16. The tray support system of claim 15, wherein when the tray is moved to one of the first position and the second position, the first tab engages the first offset of the first support rail and the second tab engages the second offset of the second support rail.

17. The tray support system of claim 15, wherein the first tab is provided on a first side of the tray closer to a first end of the tray and the second tab is provided on a second side of the tray closer to a second end of the tray.

* * * * *